US007982838B2

(12) United States Patent  (10) Patent No.: US 7,982,838 B2
Nagano et al.  (45) Date of Patent: Jul. 19, 2011

(54) LIQUID CRYSTAL DISPLAY COMPRISING FIRST AND SECOND SHIELDING ELECTRODE PATTERNS AND MANUFACTURING METHOD THEREOF

(75) Inventors: Shingo Nagano, Chiyoda-ku (JP); Yuichi Masutani, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 981 days.

(21) Appl. No.: 11/396,458

(22) Filed: Apr. 4, 2006

(65) Prior Publication Data

US 2006/0256249 A1 Nov. 16, 2006

(30) Foreign Application Priority Data

May 10, 2005 (JP) ................................. 2005-137211

(51) Int. Cl.
*G02F 1/1343* (2006.01)
*G02F 1/1333* (2006.01)

(52) U.S. Cl. ........................................ 349/141; 349/111
(58) Field of Classification Search .................... 349/43, 349/141, 111
See application file for complete search history.

(56) References Cited

U.S. PATENT DOCUMENTS

| 6,356,331 | B1 | 3/2002 | Ono et al. | |
|---|---|---|---|---|
| 6,417,906 | B2 | 7/2002 | Ohta et al. | |
| 6,661,492 | B2 | 12/2003 | Kim | |
| 6,724,454 | B2* | 4/2004 | Kim et al. | 349/141 |
| 6,744,482 | B2* | 6/2004 | Matsumoto et al. | 349/141 |
| 6,982,776 | B2 | 1/2006 | Nagano et al. | |
| 7,006,186 | B2* | 2/2006 | Chung | 349/141 |
| 7,116,388 | B2* | 10/2006 | Liu | 349/141 |
| 2001/0005252 | A1 | 6/2001 | Lee et al. | |
| 2002/0057411 | A1 | 5/2002 | Kim et al. | |
| 2002/0063835 | A1* | 5/2002 | Kim | 349/141 |
| 2003/0227590 | A1* | 12/2003 | Oke et al. | 349/141 |
| 2004/0041970 | A1* | 3/2004 | Lee et al. | 349/141 |
| 2004/0046917 | A1* | 3/2004 | Nakayoshi et al. | 349/141 |
| 2004/0135939 | A1* | 7/2004 | Luo | 349/110 |
| 2004/0169808 | A1* | 9/2004 | Shih et al. | 349/141 |
| 2004/0212761 | A1* | 10/2004 | Kadotani et al. | 349/110 |
| 2004/0218131 | A1* | 11/2004 | Kim et al. | 349/141 |
| 2005/0168665 | A1* | 8/2005 | Ina et al. | 349/42 |

FOREIGN PATENT DOCUMENTS

JP 8-254712 10/1996

(Continued)

*Primary Examiner* — Mark A Robinson
*Assistant Examiner* — Charles Chang
(74) *Attorney, Agent, or Firm* — Oblon, Spivak, McClelland, Maier & Neustadt, L.L.P.

(57) ABSTRACT

Source lines cross, over an intervening first insulation film, gate lines on an insulation substrate. Switching elements are on crossings between the gate lines and the source lines. Pixel electrodes are connected to the switching elements. Common electrodes facing the pixel electrodes generate between the pixel electrodes and the common electrodes an electric field directed approximately parallel to the insulation substrate. First shielding electrode patterns along the source lines in a layer, with the first insulation film intervening, underneath the source lines, at least partially overlap the source lines widthwise. Plural second shielding electrode patterns are formed along the source lines, overlapping the first shielding electrode patterns and without substantially overlapping the source lines in a layer, with a second insulation film intervening, above the source lines. The first shielding electrode patterns having a same electric potential as the plural second shielding electrode patterns.

10 Claims, 10 Drawing Sheets

FOREIGN PATENT DOCUMENTS

| | | |
|---|---|---|
| JP | 10-020338 | 1/1998 |
| JP | 2000-028993 | 1/2000 |
| JP | 2001-33814 | 2/2001 |
| JP | 2003-307741 | 10/2003 |
| JP | 2004-177545 | 6/2004 |
| KR | 2001-0030357 | 4/2001 |
| KR | 2001-0063296 | 7/2001 |
| KR | 2001-0081251 | 8/2001 |
| KR | 2001-0106862 | 12/2001 |
| KR | 2002-0061889 | 7/2002 |

* cited by examiner (a)

(b)

(a)

(b)

(a)

(b)

(a)

(b)

(a)

(b)

(a)

(b)

(a)

(b)

(a)

(b)

(a)

(b)

LIQUID CRYSTAL DISPLAY COMPRISING FIRST AND SECOND SHIELDING ELECTRODE PATTERNS AND MANUFACTURING METHOD THEREOF

BACKGROUND OF THE INVENTION

1. Field of the Invention

The present invention relates to active-matrix-type liquid crystal displays using a lateral-direction-electric-field mode (in-plane-switching, referred to as IPS in the following explanations), and to a manufacturing method for the displays.

2. Description of the Related Art

Recently, the IPS mode, by which an electric field is applied to a liquid crystal parallel to its substrate, has been used in active-matrix-type liquid crystal displays, as a method for obtaining super wide viewing angle. When the IPS mode is adopted, it has been proved that variation in contrast and reversal of gradation level rarely occur (for example, refer to Patent Document 1).

FIG. 9 (a) is a plane view illustrating a pixel portion of a liquid crystal display using a conventional general-use IPS mode, and FIG. 9 (b) is a cross-sectional view along the line "A-A" of the pixel portion. The liquid crystal display includes a TFT array substrate "100", a facing substrate "200", and a liquid crystal "300" installed between the substrates. The TFT array substrate 100 includes: gate lines "1" as a plurality of scan signal lines formed on a transparent-insulation substrate "92" such as a glass substrate; a common line "3" for forming storage capacitance; a plurality of source lines "2", for applying a signal voltage, that cross the common line 3, over an intervening gate insulation film "8"; a plurality of pectinate pixel electrodes "5" formed parallel to the source lines 2; a plurality of pectinate common electrodes "6" arranged alternately with and parallel to the pixel electrodes 5; a semiconductor film "7" forming switching elements each composed of a thin film transistor (referred to as a TFT in the following explanations); drain electrodes "4", source electrodes "91"; and an interlayer insulation film "9".

When a different signal voltage from another pixel is supplied to the source lines 2 in a state in which a switching element is off and a voltage for driving the liquid crystal 300 is retained by the storage capacitance between the pixel electrodes 5 and the common electrodes 6, a leak electric field is generated from the source lines 2 by the signal voltage, which varies the molecule alignment state of the liquid crystal 300 neighboring the source lines 2. Thereby, wrong display, such as cross-talk, has been caused in the source line 2 directions. In the conventional liquid crystal display, in order to reduce influence to images in the region where the molecule alignment of the liquid crystal 300 is disturbed, and in order for the common electrodes 6 neighboring the source lines 2 to serve also as electric-field-shielding electrodes, portions of the common electrodes 6 neighboring the source lines 2 are wider than the other portions. As a result, there have been problems in that the width "L1" of a region, near the source lines 2, that does not contribute to light transmission is expanded, so that a pixel aperture rate is decreased.

In order to solve the above-described problems, a configuration illustrated in FIGS. 10 (a) and (b) has been proposed. FIG. 10 (a) is a plane view illustrating a pixel portion of a liquid crystal display using the IPS mode, and FIG. 10 (b) is a cross-sectional view along the line "B-B" of the pixel portion. The pixel electrodes 5 and the common electrodes 6 are formed on the interlayer insulation film 9 in the configuration. By etching the gate insulation film 8 and the interlayer insulation film 9 in the same processing step, contact holes 10 for electrically connecting the common line 3 and the common electrodes 6 as well as the drain electrodes 4 and the pixel electrodes 5 are formed. The common electrodes 6 are arranged to cover the source lines 2 so that both of these overlap each other.

In the above configuration, because the common electrodes 6 neighboring the source lines 2 have a function as electric-field-shielding electrodes and effectively shield a leak electric field generated from the source lines 2, the molecule misalignment state of the liquid crystal 300 can be reduced. Thereby, a width "L2" that limits light transmission can be narrowed, and the pixel aperture rate can be increased (for example, refer to Patent Document 2).

Patent Document 1:
Japanese Laid-Open Open Patent Publications 1996-254712
Patent Document 2:
Japanese Laid-Open Open Patent Publications 2003-307741

SUMMARY OF THE INVENTION

Problems to be Solved by the Invention

However, in the configuration illustrated in FIG. 10, there have been problems in that short circuit between the source lines 2 and the common electrodes 6 easily occurs due to defect of the interlayer insulation film 9, because the source lines 2 and the common electrodes 6 are overlapped.

Although the short circuit can be substantially decreased by adding manufacturing processes, for example, forming the interlayer insulation film 9 a plurality of times, there have been problems in that the number of manufacturing processes further increases.

The present invention has been made in order to solve the above problems, and provide a liquid crystal display and a manufacturing method for the display in which the molecule misalignment in a liquid crystal orientation can be reduced by effectively shielding the leak electric field from the source lines 2, the pixel aperture rate can be increased so that the short circuit between the source lines 2 and the common electrodes 6 rarely occurs without adding manufacturing processes.

Means for Solving the Problems

In a liquid crystal display related to the present invention, first electrode patterns are arranged along the source lines in a layer, with a first insulation film intervening, underneath the source lines, and second electrode patterns are arranged along the source lines in a layer, with a second insulation film intervening, above the source lines, in positions where the second electrode patterns do not substantially overlap the source lines, thereby, a leak electric field from the source lines can be effectively shielded by the electrode patterns that are arranged underneath and above the source lines.

According to the present invention, a liquid crystal display and a manufacturing method for the display can be provided in which the pixel aperture rate can be increased without adding any manufacturing process, and the molecule misalignment in liquid crystal due to a leak electric field from the source lines can be reduced.

DESCRIPTION OF THE SYMBOLS

"1" are gate lines, "2" are source lines, "3" is a common line, "4" are drain electrodes, "5" are pixel electrodes, "6" are common electrodes, "7" is a semiconductor film, "8" is a gate insulation film, "9" is an interlayer insulation film, "10" are contact holes, "11" are first electric-field-shielding electrodes, "12" are second electric-field-shielding electrodes, "90" is a contact film, "91" are source electrodes, "92" is a transparent-insulation substrate, "100" is a TFT array substrate, "200" is a facing substrate, and "300" is a liquid crystal.

DETAILED DESCRIPTION OF THE PREFERRED EMBODIMENTS

Embodiment 1

Figure 1:
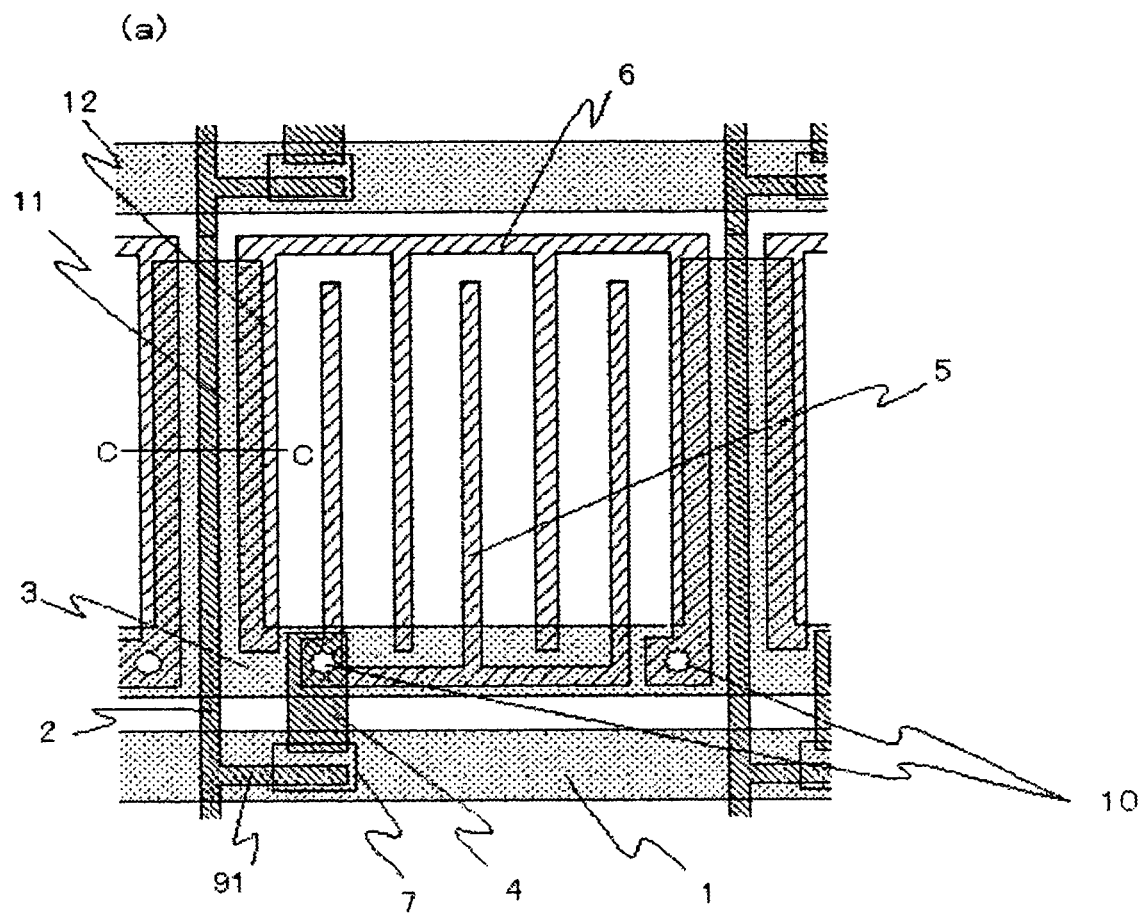
FIG. 1 are a plane view illustrating a pixel portion of a liquid crystal display according to Embodiment 1 of the invention and a cross-sectional view along the line "C-C" neighboring source lines of the same.
Figure 1:
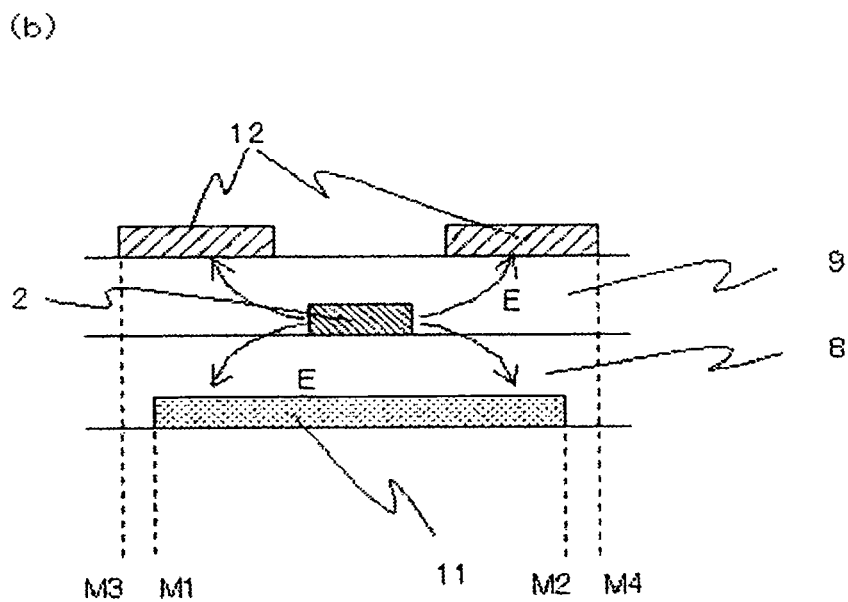

FIGS. 1 (a) and (b) illustrate a plane view of a pixel portion in an array substrate according to Embodiment 1 of the invention and a cross-sectional view along the line "C-C" neighboring the source line of the pixel, respectively. First electric-field-shielding electrodes "11" illustrated as first electrode patterns and second electric-field-shielding electrodes "12" illustrated as second electrode patterns are formed along source lines "2". In FIGS. 1 (a) and (b), the other structures having the same reference numbers are the same as those in the conventional example.

In FIG. 1 (a), firstly, gate lines "1", a common line "3", and the first electric-field-shielding electrodes 11 integrated with the common line 3 are formed on a transparent-insulation substrate such as a glass substrate, with a conducting film in the same layer, and a gate insulation film "8", as a first insulation film, is formed in a layer above the lines and the electrodes. Secondly, after a semiconductor film "7"composing a TFT is formed, the source lines 2, source electrodes "91", and drain electrodes "4" are formed, and an interlayer insulation film "9", as a second insulation film, is formed in a layer above the film, the lines, and the electrodes. Thirdly, by etching the gate insulation film 8 and the interlayer insulation film 9 in the same process, contact holes "10" are formed for electrically connecting the common line 3 with common electrodes "6" as well as connecting the drain electrodes 4 with pixel electrodes "5". Finally, the pixel electrodes 5, the common electrodes 6, and the second electric-field-shielding electrodes 12 integrated with the common electrodes 6 are formed with a conducting film in the same layer.

In Embodiment 1, the first electric-field-shielding electrodes 11 are arranged along the source lines 2 so as to overlap the source lines 2 across their entire width, except crossings between the gate lines 1 and the source lines 2, and portions neighboring the crossings. The second electric-field-shielding electrodes 12 are arranged along the source lines 2 without substantially overlapping the source lines 2.

Here, more detailed explanations on Embodiment 1 will be given using FIG. 1 (b). In FIG. 1 (b), the first electric-field-shielding electrodes 11 are wider than the source lines 2, and those electrodes and lines overlap each other, with the gate insulation film 8 intervening. The second electric-field-shielding electrodes 12 are formed in a layer above the source lines 2, with the interlayer insulation film 9 intervening, but those do not substantially overlap each other.

In addition, the expression that those do not substantially overlap each other in this specification does not only mean that those do not completely overlap the entire source lines 2, but means that those may overlap a portion of the source lines 2 as long as effects of the invention are not impaired.

By composing a pixel portion as described above, part of a leak electric field "E" from the source lines 2 is brought into the first electric-field-shielding electrodes 11 side, so that the leak electric field "E" that must be shielded by the second electric-field-shielding electrodes 12 is decreased. Therefore, the width of the second electric-field-shielding electrodes 12 can be designed to be narrower, and a region, neighboring the source lines 2, that does not contribute to light transmission can be decreased. As a result, its pixel aperture rate can be increased.

Moreover, because the second electric-field-shielding electrodes 12 and the source lines 2 do not substantially overlap each other, short circuit between the source lines 2 and the electrodes 12, which is generated due to defect of the interlayer insulation film 9, rarely occurs, resulting in improving pixel yield.

Furthermore, because an additional manufacturing process, such as a process forming the interlayer insulation film 9 with a plurality of layers, is not necessary to prevent short circuit, and high productivity can be realized.

Meanwhile, because the gate insulation film 8 has been formed with a thick layer or a plurality of layers in order to prevent short circuit between the gate lines 1 and the semiconductor film 7 forming a TFT, short circuit between the source lines 2 and the first electric-field-shielding electrodes 11 rarely occurs.

In addition, in Embodiment 1, the first electric-field-shielding electrodes 11 have the same electric potential as that of the common line 3, the common electrodes 6, and the second electric-field-shielding electrodes 12. When a switching element is off and a voltage for driving a liquid crystal is retained, it is desirable to keep constant the electric potentials of the first electric-field-shielding electrodes 11 and the second electric-field-shielding electrodes 12.

Because the leak electric field, which is leaked from the, first electric-field-shielding electrodes 11 to the liquid crystal, is affected by the gate insulation film 8 and the interlayer insulation film 9, the intensity of the leak electric field becomes different from the leak electric field leaked from the second electric-field-shielding electrodes 12. Therefore, it is desirable that distal edges "M1" and "M2" of the first electrodes 11 widthwise with respect to the source lines 2 do not extend beyond distal edges "M3" and "M4" of the second electrode electrodes 12 widthwise with respect to the source lines 2, respectively, so as to be arranged close to the source lines 2, so that influence from the second electric-field-shielding electrodes 12 becomes dominant, as the leak electric field for driving the liquid crystal.

Moreover, in Embodiment 1, because the first electric-field-shielding electrodes 11 are formed integrated with the common line 3 that is composed of a conducting film in the same layer as the gate lines 1, any additional manufacturing process is not required. Furthermore, because the second electric-field-shielding electrodes 12 are formed integrated with the common electrodes 6 that are composed of a conducting film in the same layer as the pixel electrodes 5, any manufacturing process is not added either.

In addition, in Embodiment 1, if the pixel electrodes 5, the common electrodes 6, and the second electric-field-shielding electrodes 12 in the same layer are formed with the same transparent conducting film such as ITO (indium tin oxide), light transmittance can be further increased, so that an effective pixel aperture rate can be increased.

Next, manufacturing process flows for a liquid crystal display according to Embodiment 1 of the invention will be explained using FIG. 2.

Figure 2:
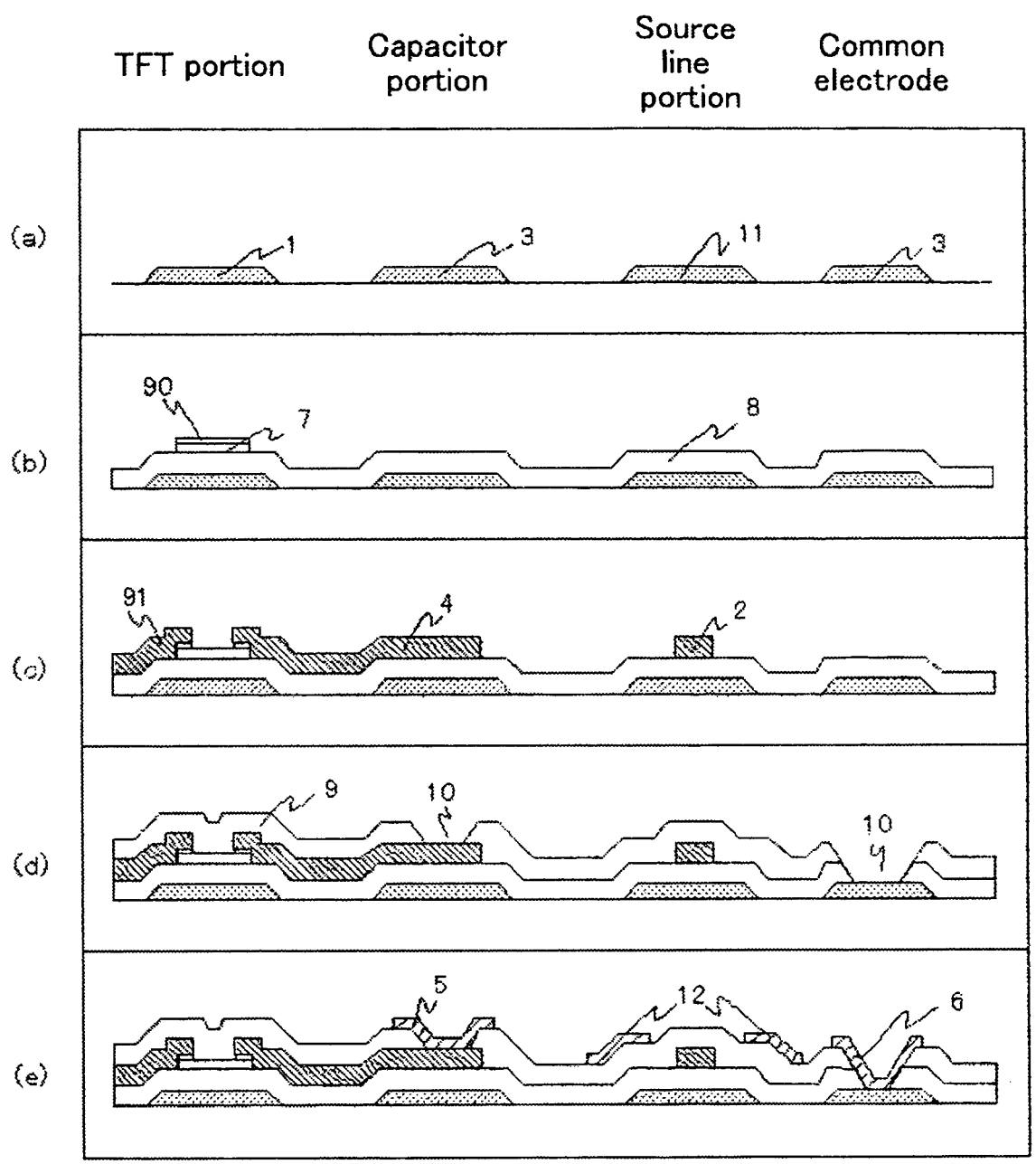
FIG. 2 are manufacturing process flows of the liquid crystal display according to Embodiment 1 of the invention.

Firstly, as illustrated in FIG. 2 (a), the gate lines 1, the common line 3, and the first electric-field-shielding electrodes 11 are formed using a photomechanical technology and a fine processing technology, after transparent conducting films or a multi-layer film including those films made of metals such as ITO, metals such as Cr, Al, Ti, Mo, W, Ni, Cu, Au, and Ag, or alloys including those metals as their major constituents has been formed on the insulation substrate using a sputter method or an evaporation method.

Secondly, as illustrated in FIG. 2 (b), the gate insulation film 8 including nitride-silicon or oxide-silicon, the semiconductor film 7 including amorphous silicon or poly-crystal silicon, and a contact film "90" including n-type-amorphous-silicon, n-type-poly-silicon or the like in which an impurity such as phosphor has been doped in a high density, are formed using a plasma CVD method, an normal pressure CVD method, or a reduced pressure CVD method. In addition, it is desirable that the gate insulation film 8 is formed a plurality of times in order to prevent short circuit generated by film deficiency such as a pinhole. Next, the contact film 90 and the semiconductor film 7 are formed in an insular shape using a photomechanical technology and an etching technology.

Thirdly, as illustrated in FIG. 2 (c), the source lines 2, the source electrodes 91, and the drain electrodes 4 are formed using a photomechanical technology and a fine processing technology, after transparent conducting films or a multi-layer film including those films made of metals such as ITO, metals such as Cr, Al, Ti, Mo, W, Ni, Cu, Au, and Ag, or alloys including those metals as their major constituents has been formed using the sputter method or the evaporation method. Moreover, the contact film 90 in a portion that forms the channel of a TFT, is etched using masks, such as the source electrodes 91, the drain electrodes 4, or photoresist that has been patterning-processed when those electrodes are formed.

Next, as illustrated in FIG. 2 (d), the interlayer insulation film 9 is formed, which is a second insulation film made of an inorganic insulation film such as nitride-silicon or oxide-silicon, or organic resin; then, the contact holes 10 are formed using the photomechanical technology and the etching technology.

Lastly, as illustrated in FIG. 2 (e), the pixel electrodes 5, the common electrodes 6, and the second electric-field-shielding electrodes 12 are formed using the photomechanical technology and the fine processing technology, after transparent conducting films or a multi-layer film including those films made of metals such as ITO, metals such as Cr, Al, Ti, Mo, W, Ni, Cu, Au, and Ag, or alloys including those metals as their major constituents has been formed using the sputter method or the evaporation method.

Through the above processes, a TFT array substrate composing a liquid crystal display, using the IPS mode, according to Embodiment 1 can be manufactured.

On the TFT array substrate manufactured as described above, a molecule alignment film is applied in the following cell-process, and molecule alignment process is performed to orient in a uniform direction using a rubbing method or the like. In a similar way, the molecule alignment film is applied on a facing substrate facing the TFT array substrate, and molecule alignment process is performed to orient in a uniform direction using a rubbing method or the like. The TFT array substrate and the facing substrate are stacked keeping a predefined space in such a way that those molecule alignment films face each other, edge portions of the substrates are bonded with seal material, and then both substrates are sealed after a liquid crystal is filled between the substrates. Then, after polarizing plates have been bonded on both sides of the liquid crystal cell, manufacturing a liquid crystal is completed by connecting a driving circuit and fitting thereto a back light unit at last.

Embodiment 2

Figure 3:
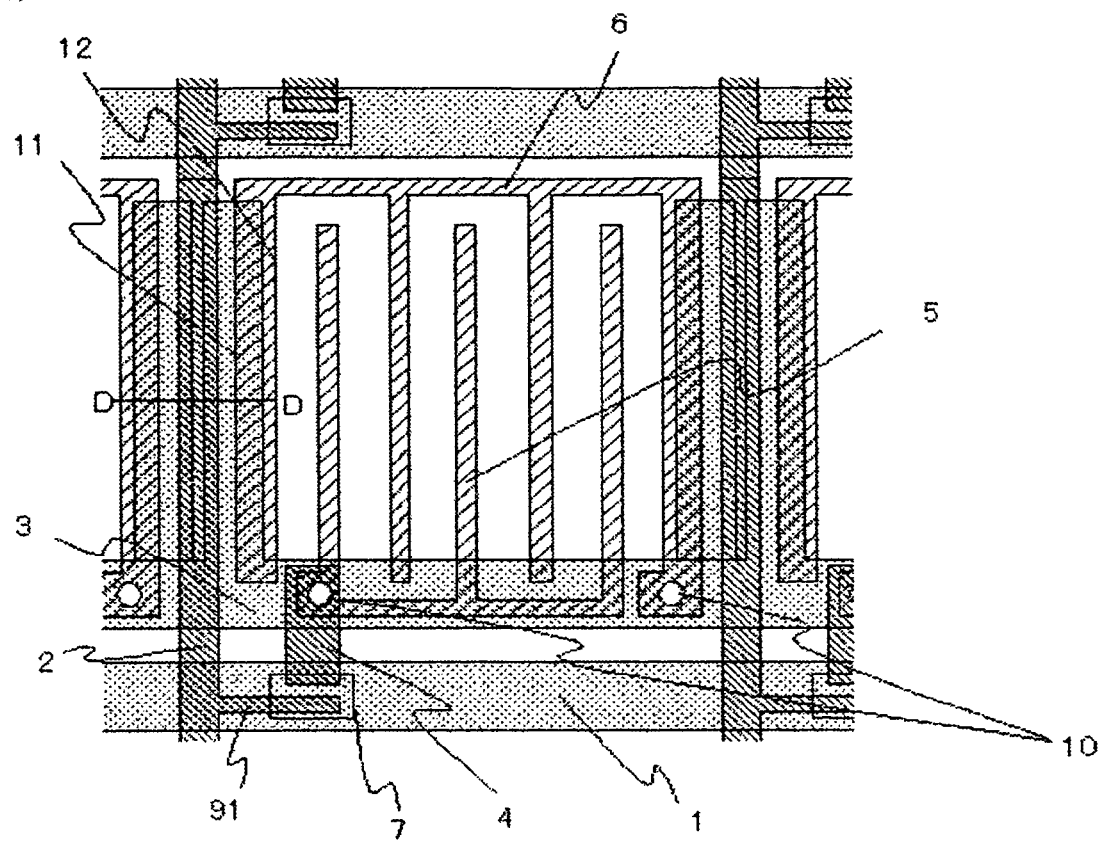
FIG. 3 are a plane view illustrating a pixel portion of a liquid crystal display according to Embodiment 2 of the invention and a cross-sectional view along the line "D-D" neighboring source lines of the same.
Figure 3:
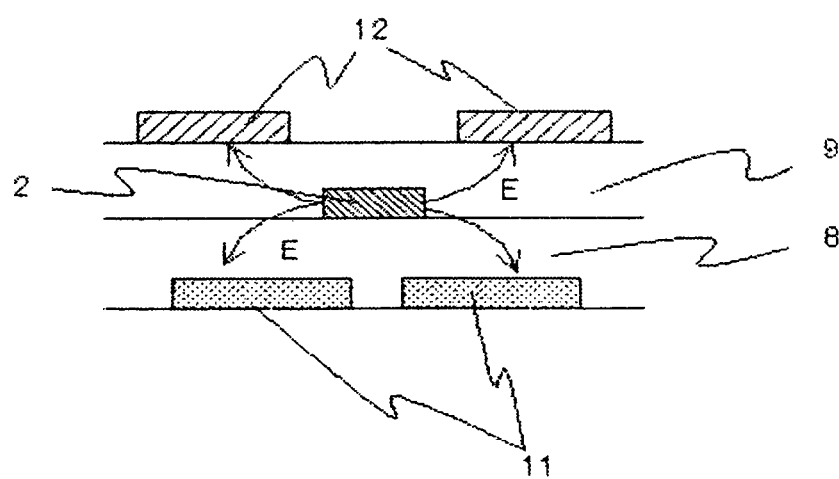

FIGS. 3 (a) and (b) are a plane view illustrating a pixel portion of a liquid crystal display according to Embodiment 2 of the invention and a cross-sectional view along the line "D-D" neighboring the source line of the pixel, respectively. The configuration in Embodiment 2 differs from that in Embodiment 1 in that the first electric-field-shielding electrodes 11 do not overlap the source lines 2 across their entire width but partially overlap the source lines 2 widthwise. The basic operation and functionality thereof are the same as those in Embodiment 1.

When the configuration is compared with that of Embodiment 1, not only short circuit between the source lines 2 and the electrodes 11 can be further reduced, but also the parasitic capacitance of the source lines 2 can be reduced less than that in Embodiment 1, because the pull-in effect of the leak electric field E from the source lines 2 to the liquid crystal remains intact, and overlapped area of the first electric-field-shielding electrodes 11 with the source lines 2 is narrow.

Embodiment 3

Figure 4:
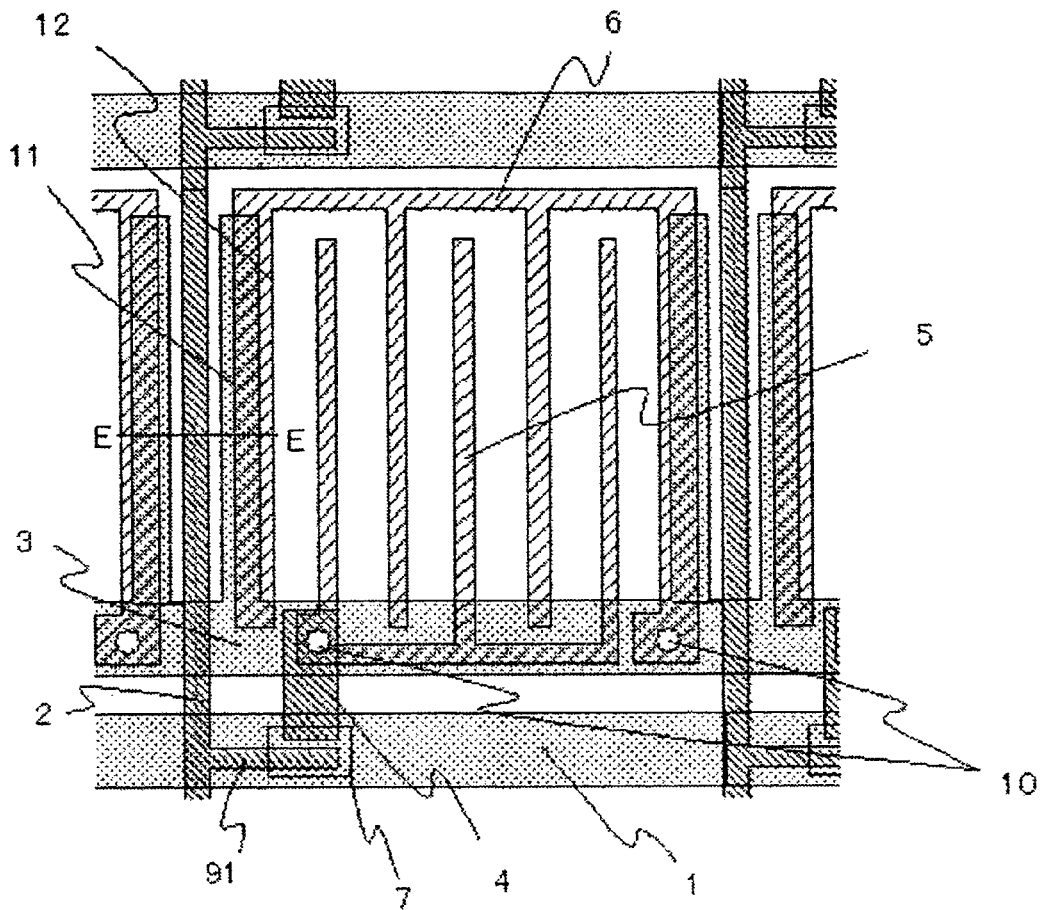
FIG. 4 are a plane view illustrating a pixel portion of a liquid crystal display according to Embodiment 3 of the invention and a cross-sectional view along the line "E-E" neighboring source lines of the same.
Figure 4:
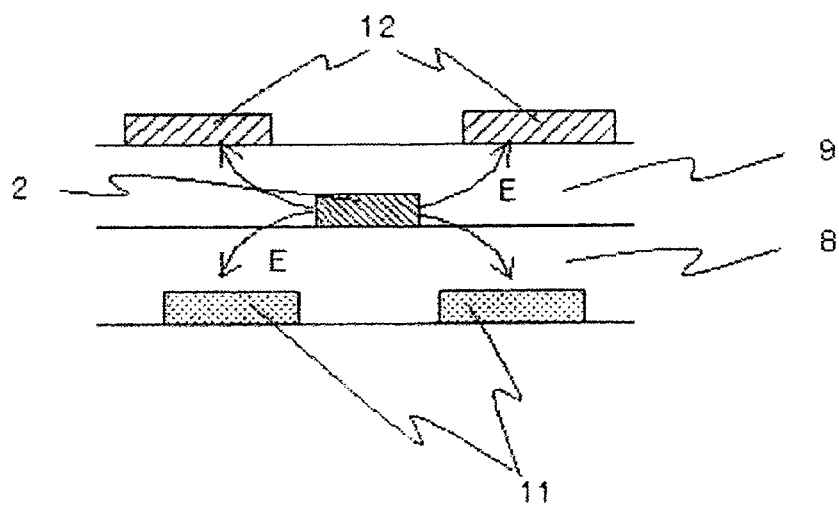

FIGS. 4 (a) and (b) are a plane view illustrating a pixel portion of a liquid crystal display according to Embodiment 3 of the invention and a cross-sectional view along the line "E-E" neighboring the source line of the pixel, respectively. In FIG. 4, the configuration of Embodiment 3 is different from that of Embodiment 1 in that the first electric-fieldshielding electrodes 11 do not overlap the source lines 2 across their entire width, but the first electric-field-shielding electrodes 11 are arranged along the source lines 2 without overlapping the source lines 2. The basic operation and functionality thereof are the same as those in Embodiment 1.

When the configuration is compared with those in Embodiment 1 and Embodiment 2, short circuit rarely occurs, and the parasitic capacitance of the source lines 2 can be reduced less than the parasitic capacitances in Embodiment 1 and Embodiment 2, because the pull-in effect of the leak electric field E from the source lines 2 to the liquid crystal remains intact, and the first electric-field-shielding electrodes 11 do not overlap the source lines 2.

Embodiment 4

Figure 5:
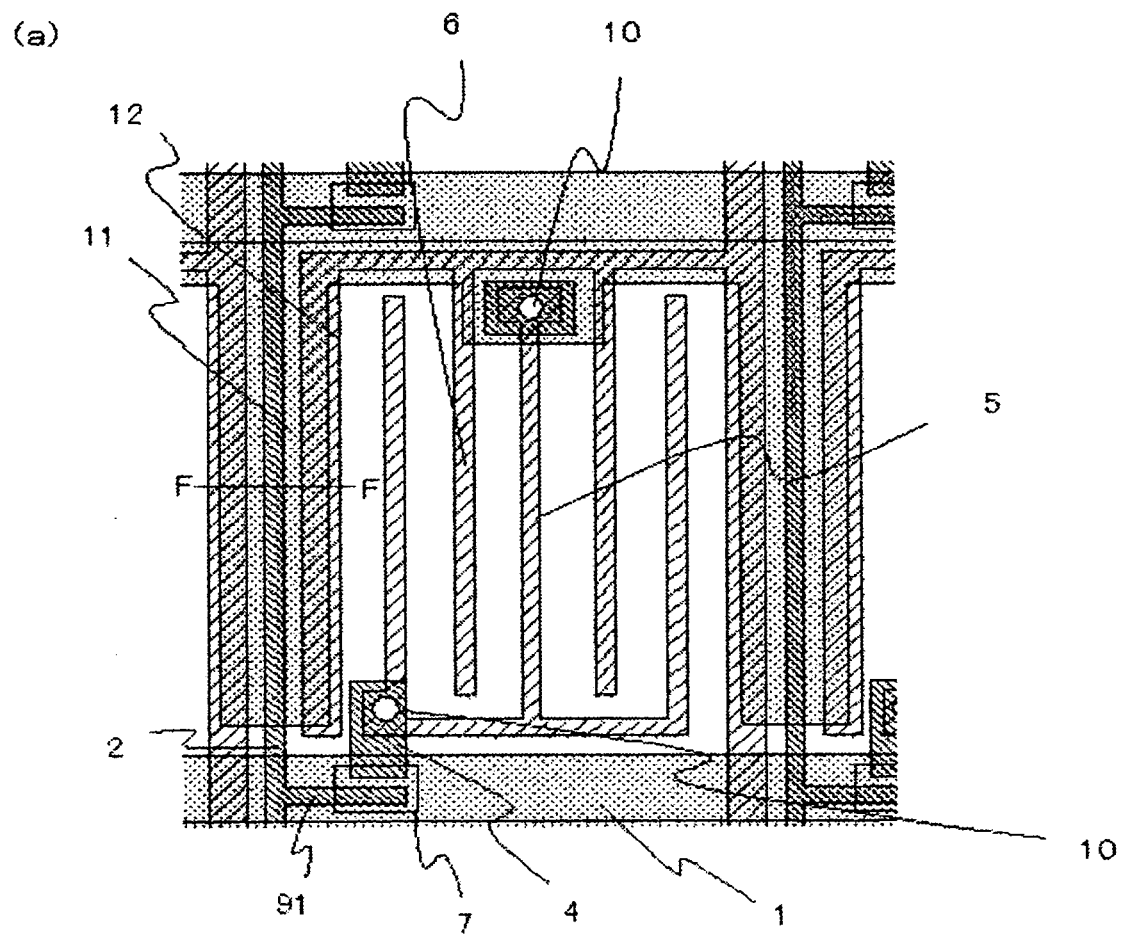
FIG. 5 are a plane view illustrating a pixel portion of a liquid crystal display according to Embodiment 4 of the invention and a cross-sectional view along the line "F-F" neighboring source lines of the same.
Figure 5:
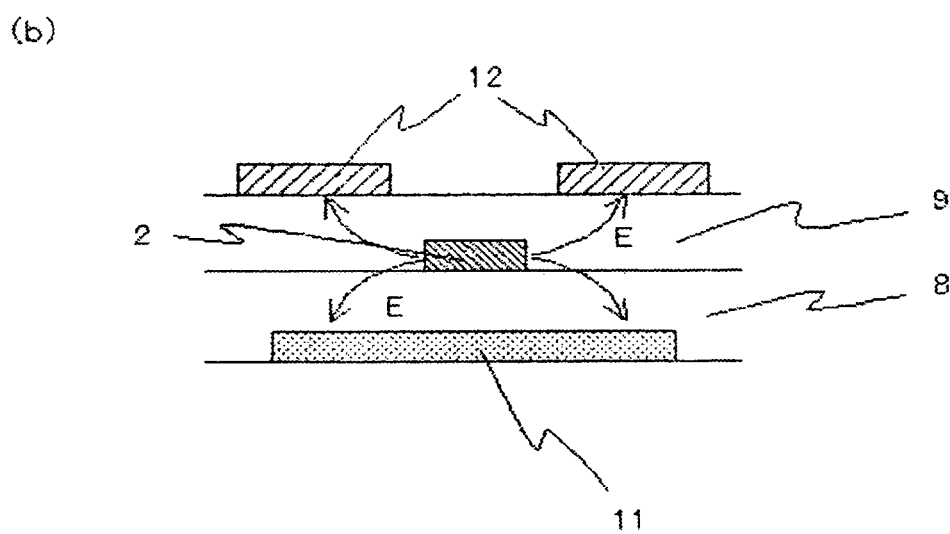

FIGS. 5 (a) and (b) are a plane view illustrating a pixel portion of a liquid crystal display according to Embodiment 4 of the invention and a cross-sectional view along the line "F-F" neighboring the source line of the pixel, respectively. In Embodiment 4, the first electric-field-shielding electrodes 11 are integrated with the gate lines 1 and are formed along the source lines 2 so as to overlap the source lines 2 across their entire width. Moreover, the second electric-field-shielding electrodes 12 are integrated with the common electrodes 6 and are formed in a layer above the source lines 2 and along the source lines 2, with the interlayer insulation film 9 intervening, without overlapping the source lines 2. The configuration in FIG. 4 is different from the configuration of Embodiment 1 in that formation of retaining a capacitance is that of the Cs-on-gate that forms the storage capacitance between the gate lines 1 and the pixel electrodes 5, and no common line 3 exists.

Next, the operations will be explained. The first electric-field-shielding electrodes 11 have the same electric potential as that of the gate lines 1, and the second electric-field-shielding electrodes 12 have the same electric potential as that of the common electrodes 6. Here, although the first electric-field-shielding electrodes 11 have not the same electric potential as that of the common electrodes 6, a pull-in effect of the leak electric field E from the source lines 2 to the liquid crystal remains intact to Embodiment 1. Moreover, because the second electric-field-shielding electrodes 12 is formed, the effect of shielding the leak electric field E from the source lines 2 is almost the same as the effect in Embodiment 1.

Moreover, although the electric potential of the first electric-field-shielding electrodes 11 is different from that of the common electrodes 6, wrong display such as cross-talk does not occur, because influence from the leak electric field acting on the molecule alignment of the liquid crystal is uniform over all pixels.

Therefore, a liquid crystal display can be obtained, in which the pixel aperture rate thereof as well as yield in manufacturing are increased. Moreover, providing the liquid crystal display with the Cs-on-gate configuration enables the pixel aperture rate to be further increased, because the common line 3 is not required, and the area for the common line 3 can be used as the display area.

In addition, although the configuration of Embodiment 4 is explained as the one in which the first electric-field-shielding electrodes 11 are integrated with the gate lines 1 of the neighboring pixel, the same effect can be obtained when the first electric-field-shielding electrodes 11 are integrated with the gate lines 1 of its own.

Embodiment 5

Figure 6:
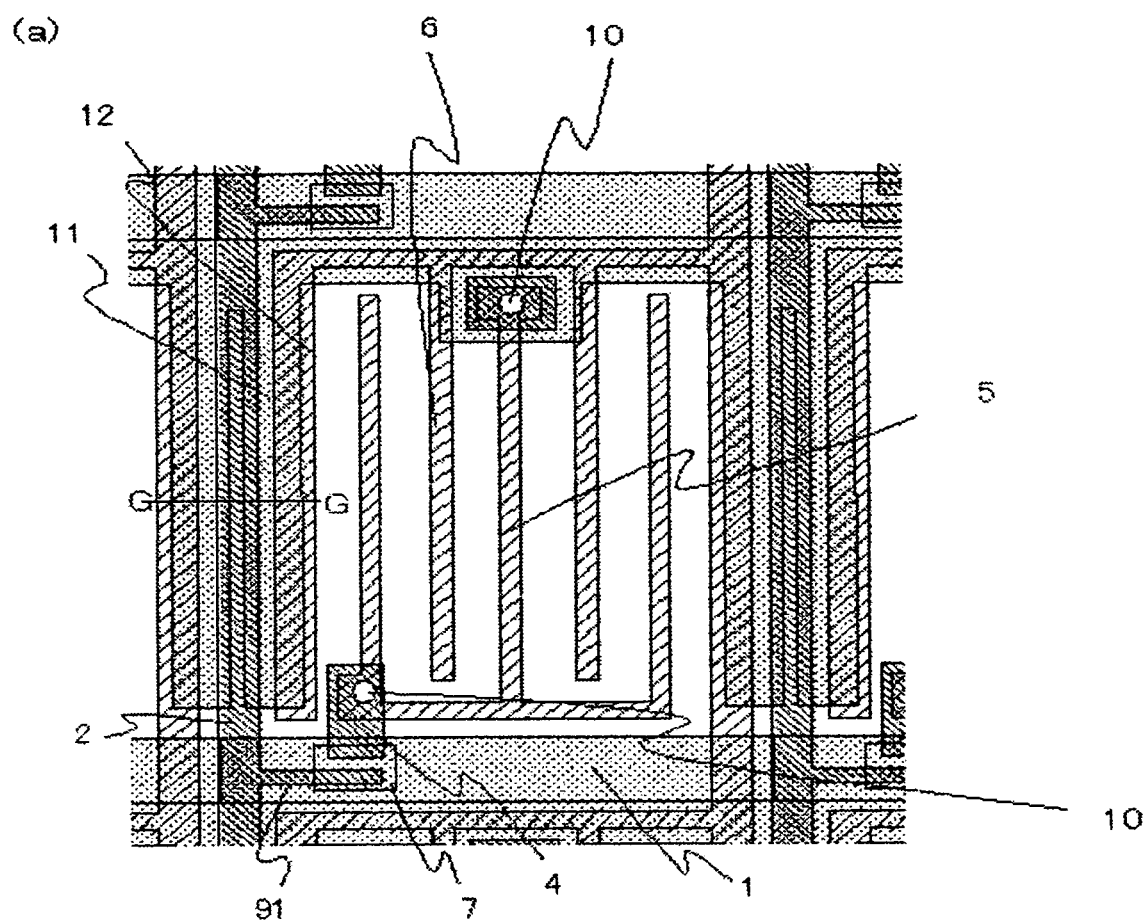
FIG. 6 are a plane view illustrating a pixel portion of a liquid crystal display according to Embodiment 5 of the invention and a cross-sectional view along the line "G-G" neighboring source lines of the same.
Figure 6:
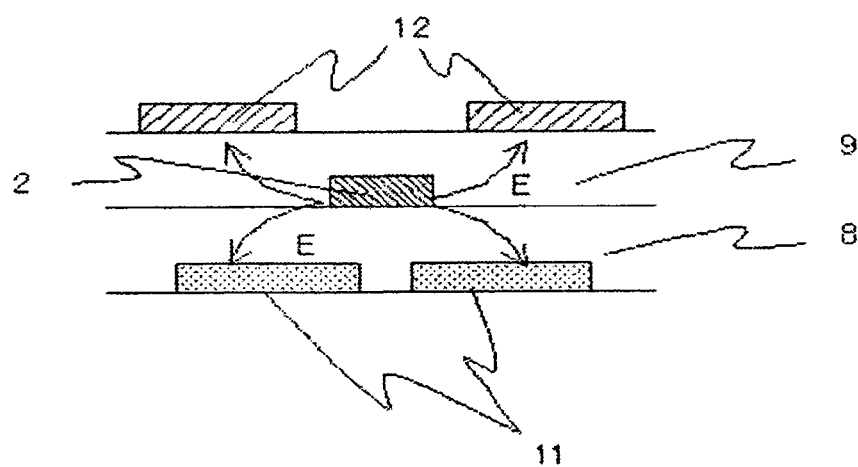

FIGS. 6 (a) and (b) are a plane view illustrating a pixel portion of a liquid crystal display according to Embodiment 5 of the invention and a cross-sectional view along the line "G-G" neighboring the source line of the pixel, respectively. The configuration in FIG. 6 is different from that of Embodiment 4 in that the first electric-field-shielding electrodes 11 do not overlap the source lines 2 across their entire width, but the first electric-field-shielding electrodes 11 partially overlap the source lines 2 widthwise.

When the configuration is compared with that of Embodiment 4, not only short circuit between the source lines 2 and the electrodes 11 can be further reduced, but also the parasitic capacitance of the source lines 2 can be reduced less than that in Embodiment 4, because the pull-in effect of the leak electric field E from the source lines 2 to the liquid crystal remains intact, and overlapped area of the first electric-field-shielding electrodes 11 with the source lines 2 is narrow.

Embodiment 6

Figure 7:
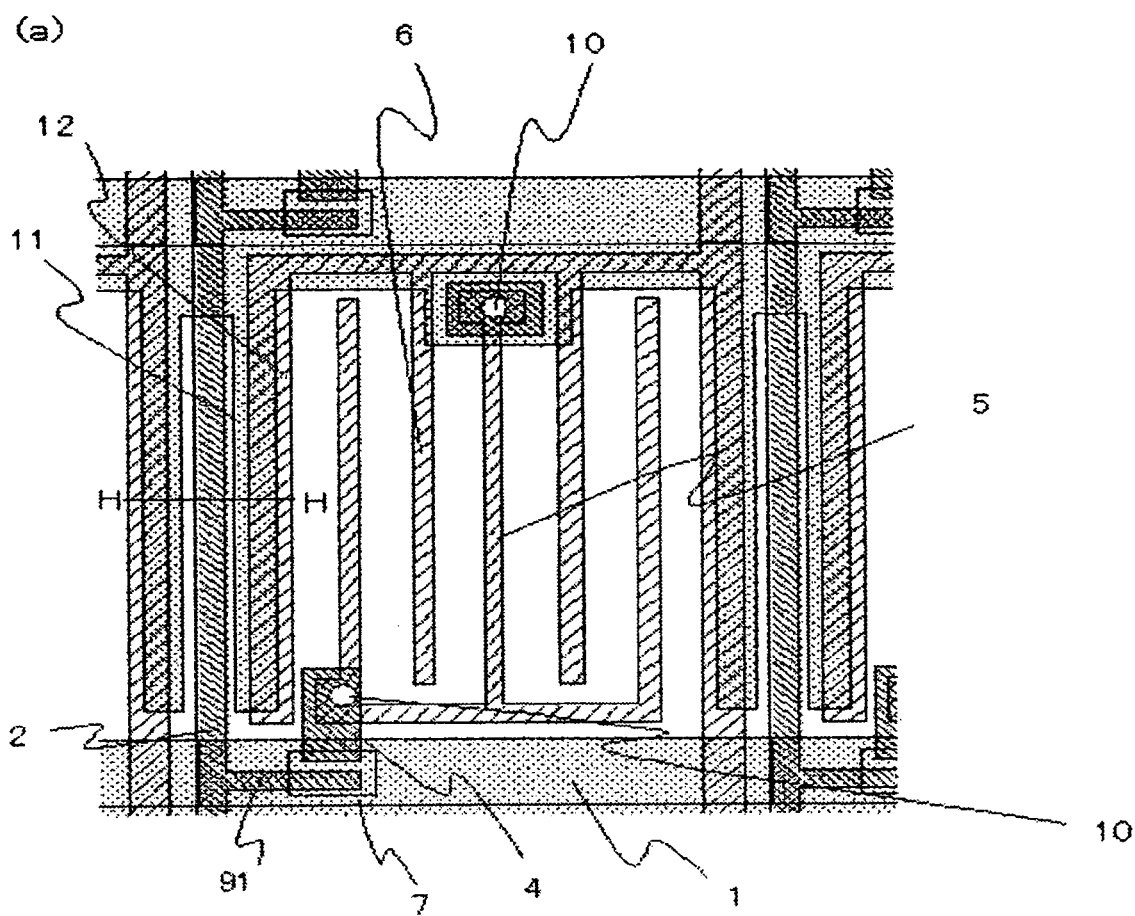
FIG. 7 are a plane view illustrating a pixel portion of a liquid crystal display according to Embodiment 6 of the invention and a cross-sectional view along the line "H-H" neighboring source lines of the same.
Figure 7:
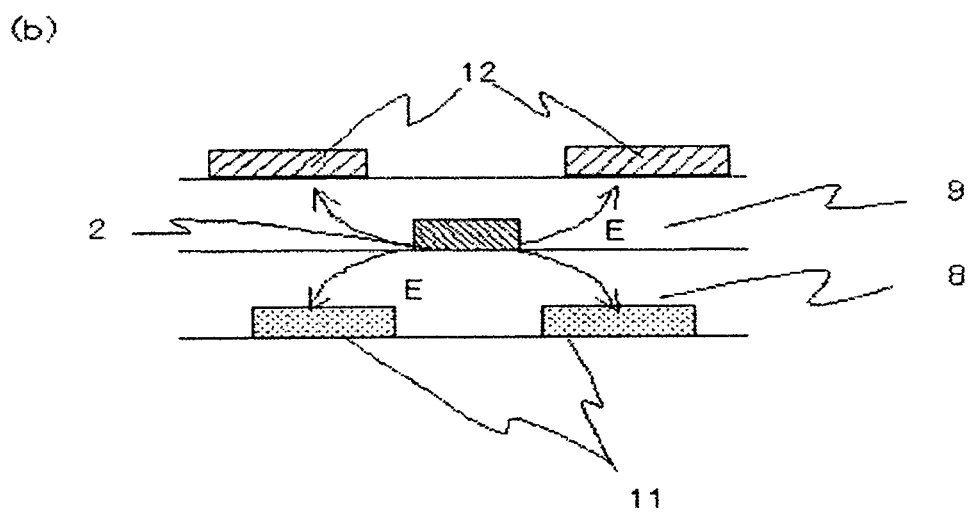

FIGS. 7 (a) and (b) are a plane view illustrating a pixel portion of a liquid crystal display according to Embodiment 6 of the invention and a cross-sectional view along the line "H-H" neighboring the source line of the pixel, respectively. The configuration in FIG. 7 is different from that of Embodiment 4 in that the first electric-field-shielding electrodes 11 do not overlap the source lines 2 across their entire width, but the first electric-field-shielding electrodes 11 are arranged along the source lines 2 without overlapping the source lines 2.

When the configuration is compared with those of Embodiment 4 and Embodiment 5, short circuit rarely occurs, and the parasitic capacitance of the source lines 2 can be reduced less than the parasitic capacitances in Embodiment 4 and Embodiment 5, because the pull-in effect of the leak electric field E from the source lines 2 to the liquid crystal remains intact, and the first electric-field-shielding electrodes 11 do not overlap the source lines 2.

Embodiment 7

Figure 8:
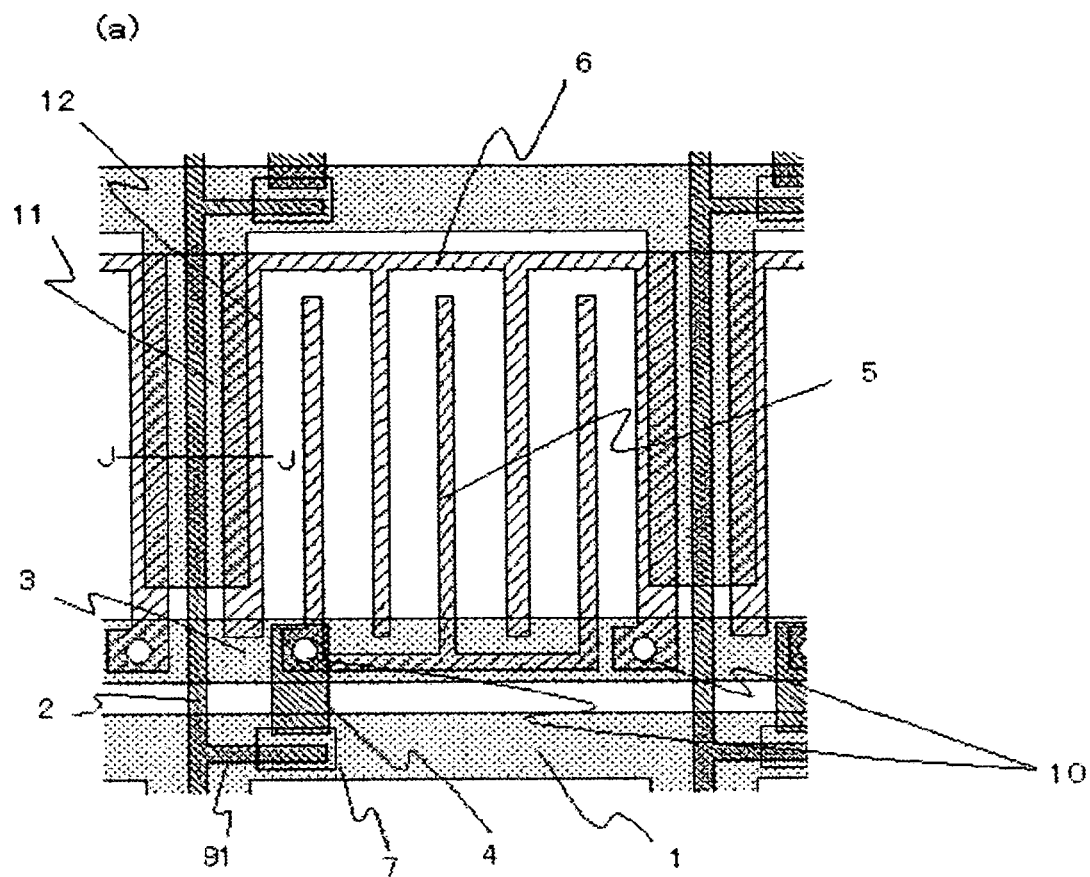
FIG. 8 are a plane view illustrating a pixel portion of a liquid crystal display according to Embodiment 7 of the invention and a cross-sectional view along the line "J-J" neighboring source lines of the same.
Figure 8:
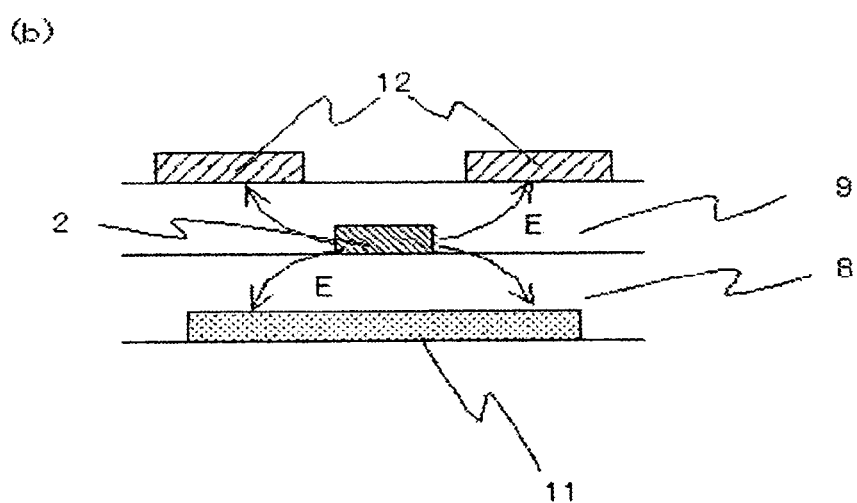
Figure 9:
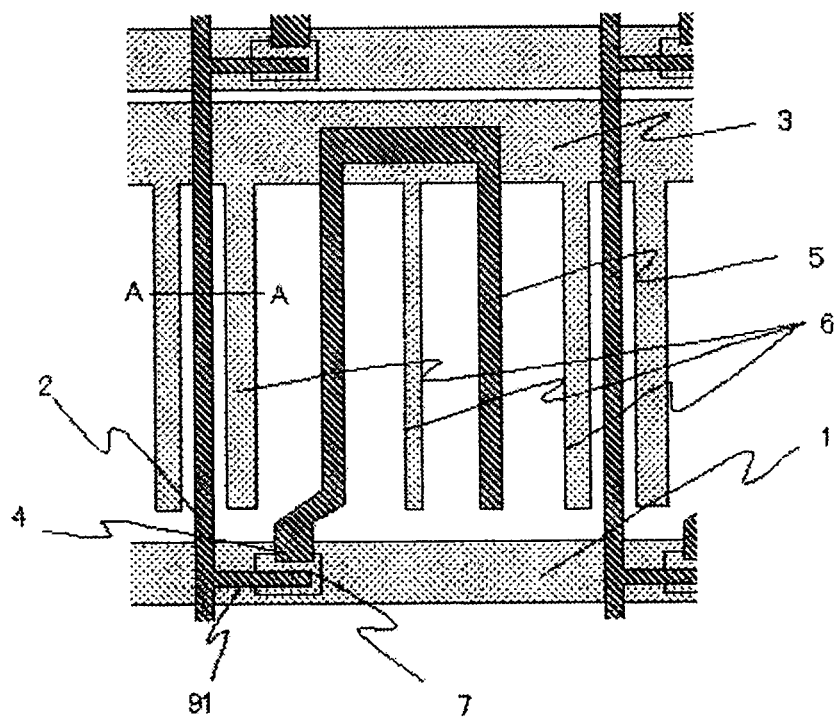
FIG. 9 are a plane view illustrating a pixel portion of a liquid crystal display using a conventional IPS mode and a cross-sectional view along the line "A-A" neighboring source lines of the same.
Figure 9:
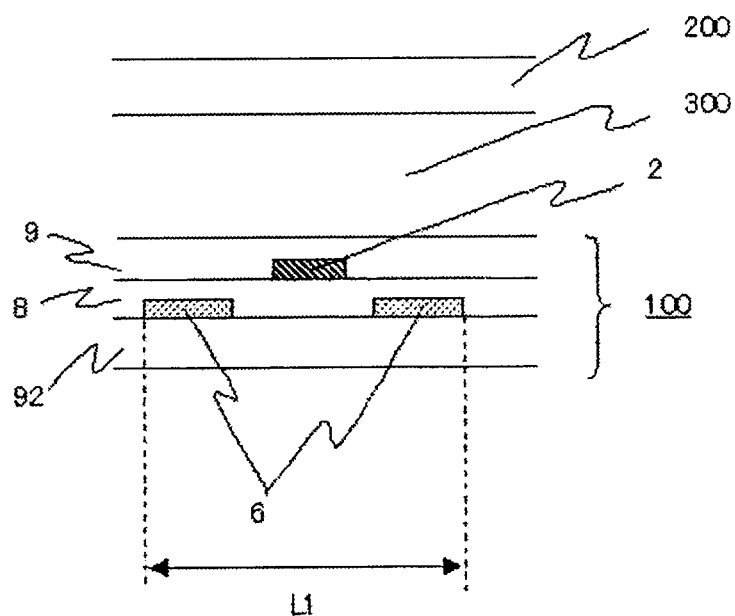
Figure 10:
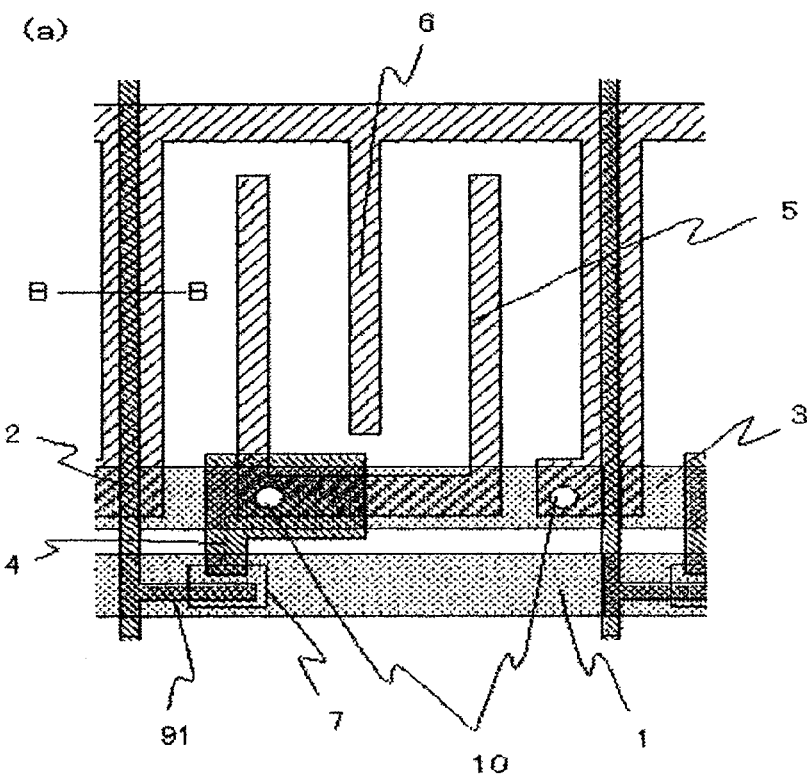
FIG. 10 are a plane view illustrating a pixel portion of another liquid crystal display using a conventional IPS mode and a cross-sectional view along the line "B-B" neighboring source lines of the same.
Figure 10:
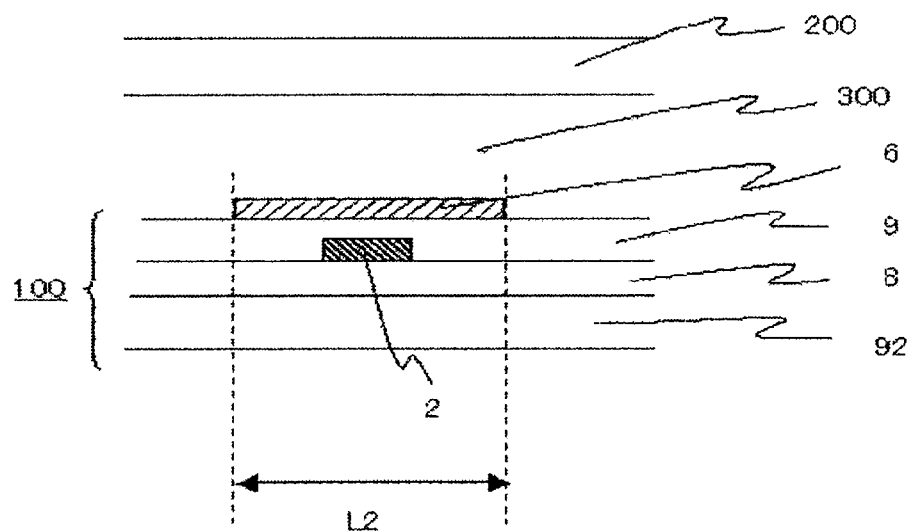

FIGS. 8 (a) and (b) are a plane view illustrating a pixel portion of a liquid crystal display according to Embodiment 7 of the invention and a cross-sectional view along the line "J-J" neighboring the source line of the pixel, respectively. In Embodiment 7, the first electric-field-shielding electrodes 11 are integrated with the gate lines 1 and arranged along the source lines 2 so as to overlap the source lines 2 across their entire width. Moreover, the second electric-field-shielding electrodes 12 are integrated with the common electrodes 6 and arranged in a layer above the source lines 2 and along the source lines 2, with the interlayer insulation film 9 intervening, without substantially overlapping the source lines 2.

In FIG. 8, the configuration is different from the configuration of Embodiment 4 in that the Cs-on-gate is not formed, but the common line 3 for forming the storage capacitance is additionally provided. The basic operation and functionality are the same as those in Embodiment 4.

In Embodiment 7, although the first electric-field-shielding electrodes 11 are integrated with the gate lines 1 or the common line 3, and the second electric-field-shielding electrodes 12 are integrated with the common electrodes 6 with a conducting film in the same layer, the electrodes each may be formed using a conducting film in the same layer as separate electrode patterns from the gate lines 1, the common line 3, and the common electrodes 6. Moreover, those electrodes may be formed on independent layers for each.

What is claimed is:

1. A liquid display device, comprising:
a liquid crystal layer sandwiched between a pair of insulation substrates disposed facing each other;
a plurality of gate lines formed on one of the insulation substrates;
a plurality of source lines formed crossing, over an intervening first insulation film, the plurality of gate lines;
switching elements formed on crossings between the plurality of gate lines and the plurality of source lines;
pixel electrodes connected to the switching elements;
common electrodes formed facing the pixel electrodes, for generating between the pixel electrodes and the common electrodes an electric field directed approximately parallel to the insulation substrates;
first shielding electrode patterns formed along the source lines in a layer, with the first insulation film intervening, underneath the source lines, at least partially overlapping the source lines widthwise; and
plural second shielding electrode patterns formed along the source lines, overlapping the first shielding electrode patterns and without substantially overlapping the source lines in a layer, with a second insulation film intervening, above the source lines, the first shielding electrode patterns having a same electric potential as the second shielding electrode patterns, wherein the second shielding electrode patterns are wider than the common electrodes.

2. The liquid display device as recited in claim 1, wherein the first and second shielding electrode patterns are formed on both widthwise sides of the source lines.

3. The liquid display device as recited in claim 1, wherein the first shielding electrode patterns are composed of a conducting film in the same layer as the gate lines.

4. The liquid display device as recited in claim 1, wherein the second shielding electrode patterns are composed of a conducting film in the same layer as the common electrodes.

5. The liquid display device as recited in claim 1, wherein the first and second shielding electrode patterns have the same electric potential as the common electrodes.

6. The liquid display device as recited in claim 1, wherein distal edges of the first shielding electrode patterns widthwise with respect to the source lines do not extend beyond distal edges of the second shielding electrode patterns widthwise with respect to the source lines.

7. A liquid display device, comprising:
a facing substrate;
the TFT array substrate according to claim 1; and
a liquid crystal sandwiched between the facing substrate and the TFT array substrate.

8. A manufacturing method for a liquid display device, comprising a liquid crystal layer sandwiched between a pair of insulation substrates disposed facing each other, a plurality of gate lines formed on one of the insulation substrates, a plurality of source lines formed crossing, over an intervening first insulation film, the plurality of gate lines, switching elements formed on crossings between the plurality of gate lines and the plurality of source lines, pixel electrodes connected to the switching elements, and common electrodes formed facing the pixel electrodes, for generating between the pixel electrodes and the common electrodes an electric field directed approximately parallel to the insulation substrates, the manufacturing method including:
forming first shielding electrode patterns along the source lines in a layer, with the first insulation film intervening, underneath the source lines, to at least partially overlap the source lines widthwise; and
forming plural second shielding electrode patterns along the source lines, overlapping the first shielding electrode patterns and without substantially overlapping the source lines in a layer, with a second insulation film intervening, above the source lines, the first shielding electrode patterns having a same electric potential as the second shielding electrode patterns, wherein the second shielding electrode patterns are wider than the common electrodes.

9. The manufacturing method as recited in claim 8, wherein the first shielding electrode patterns are composed of a conducting film in the same layer as the gate lines.

10. The manufacturing method as recited in claim 8 or claim 9, wherein the second shielding electrode patterns are composed of a conducting film in the same layer as the common electrodes.

* * * * *